BALANCED LINE PULSE RECEIVER
Filed May 20, 1965
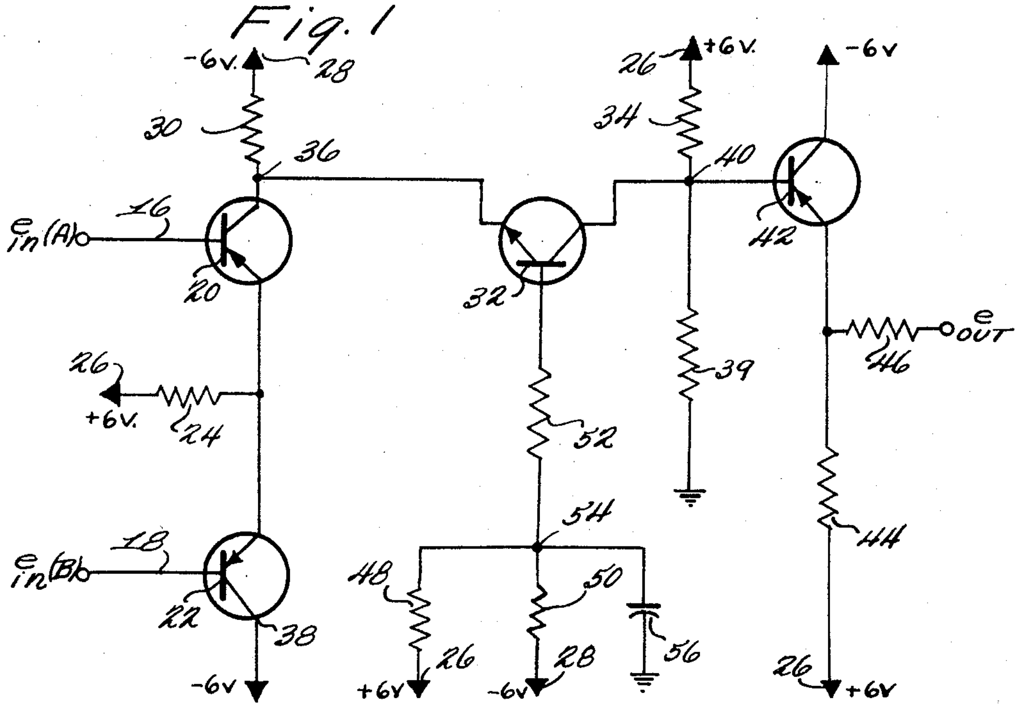
Fig. 1
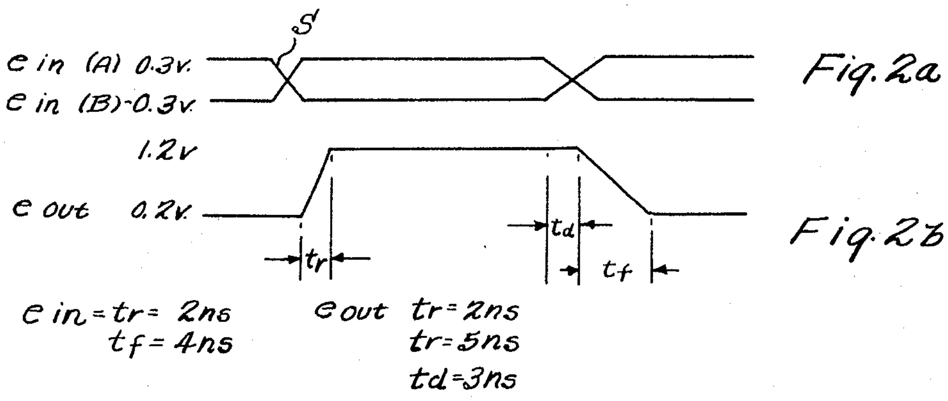
Fig. 2a Fig. 2b
Fig. 2
INVENTOR
WARREN R. PRATT
BY Cushman, Darby & Cushman
ATTORNEYS United States Patent Office 3,432,689
Patented Mar. 11, 1969

3,432,689
BALANCED LINE PULSE RECEIVER
Warren R. Pratt, White Bear Lake, Minn., assignor to Control Data Corporation, Minneapolis, Minn., a corporation of Minnesota
Filed May 20, 1965, Ser. No. 457,369
U.S. Cl. 307—255 13 Claims
Int. Cl. H03k *17/00, 17/28;* H03f *3/04*

ABSTRACT OF THE DISCLOSURE

A balanced line pulse receiver which utilizes low supply voltages, which satisfactorily operates in spite of wide variations in the positive and negative supply voltages and which maintains the impedances presented to each conductor of a balanced input line substantially equal to another as transitions occur in the input signal. First and second transistors are provided to receive the balanced input signals and a third transistor is operatively connected to one of said first or second transistors so that the impedances presented to the balanced input signals are maintained substantially equal.

This invention relates in general to balanced line pulse receivers and, in particular, to wide band, balanced line, pulse receivers which utilize low supply voltages and which satisfactorily operate in spite of wide variations in the positive and negative supply voltages for the pulse receiver. Further, this invention relates to means for maintaining the impedances presented to each conductor of a balanced input line by the pulse receiver substantially equal to one another as transitions occur in the input signal on the balanced line.

By a balanced line or differential input to the pulse receiver is meant one where the input signals on each line of the balanced line are balanced with respect to a reference potential.

In prior art pulse receivers, the switching transistors receiving the input signal from the balanced line operated with saturating logic (that is, the transistors were driven into their saturation state upon being switched on). Because of the use of saturating logic, storage or delay times were unduly long thereby limiting the response of the pulse receiver to input information signals. Typical rise and fall for storage times were usually greater than 10 nanoseconds.

Further problems arise with prior art circuitry because of the need for high supply voltages and correspondingly high value resistors to insure the proper biasing of the active elements within the pulse receiver. Because of the high resistor values necessitated by the prior art circuitry, unnecessary dissipation of power within these high valued resistors occurred.

Another problem of prior art pulse receivers arises due to use of common emitter amplifier stages, which result in the narrowing of the band width of the pulse receiver. Of course, this narrowing results in an increase in the rise and fall times associated with the pulse receiver.

Another problem of prior art pulse receivers arises because of the inability to cope with substantial variations in the supply voltages fed to the pulse receiver. It is because of this inability to cope with large voltage variations, that it is necessary to provide large supply voltages and resistors having correspondingly high values. This, of course, results in the undesirable power dissipation as mentioned above.

Balanced lines are used to transmit information signals from one module of a computer to another. To insure correct transmission of the signals it is necessary that the impedances presented to each conductor or line of the balanced line remain substantially equal to one another as transitions occur in the input signal. If this is not the case, the signal on one of the conductors will be favored over the other, thereby increasing the probability of errors in the computer system.

Accordingly, it is an object of this invention to provide a pulse receiver operating with nonsaturating logic, thereby decreasing storage or delay time within the pulse receiver and increasing the response of the pulse receiver to the input signal.

It is another object of this invention to provide a pulse receiver incorporating only common base or common collector amplifier stages, thereby enabling the pulse receiver to pass high frequencies (as high as 100 mc.) and to amplify pulses with rise and fall times as short as approximately 3.5 nanoseconds.

It is a further object of this invention to provide means for compensating the responses of a pulse receiver to an input signal from a balanced line whenever variations occur in the supply voltages to the pulse receiver.

It is another object of this invention to provide compensating means for a pulse receiver wherein voltage margins of approximately ±25% on the voltage supplies in either parallel or opposing changes can be tracked while allowing the pulse receiver to continue to function properly.

It is another object of this invention to provide pulse receivers which utilize low supply voltages and resistors having small values; thereby minimizing the amount of power absorbed and dissipated by a pulse receiver.

Another object of this invention is to maintain the impedances presented to the conductors of a balanced line by a pulse receiver substantially equal to one another as transitions occur in the input signal on the balanced lines.

It is a further object of this invention to provide a pulse receiver having a wide band and utilizing low supply voltages wherein means are provided for maintaining proper performance of the receiver in spite of large variations in the supply voltages of the pulse receiver.

Further objects and advantages of my invention will become apparent as the following description of an illustrative embodiment proceeds and the features of novelty which characterize the invention will be pointed out with particularity in the claims annexed to and forming a part of this specification.

In order to illustrate how the above objects may be accomplished, an illustrative form of my invention will be briefly discussed. A circuit is provided having a differential input (that is, connected to receive signals from a balanced line, said signals being balanced with respect to a predetermined reference potential). A first transistor and a second transistor or other suitable switching means are provided to receive the balanced input signals. They are so connected together that when one of the transistors is on, the other is off when an input signal is present on the balanced line. A source of DC voltage is directly applied to collector of the first transistor, thereby maintaining a first impedance presented to a first signal on one conductor of the balanced line at a substantially constant value during an input signal transition. A load means is connected to the collector of the second transistor and further means are provided for maintaining the voltage at the collector of the second transistor at a substantially constant value and substantially equal to the voltage applied direcly to the first transistor during an input signal transition. Therefore a second impedance presented to a second signal on the other conductor of the balanced line is maintained at a substantially constant value and substantially equal to the first impedance during input signal transitions since the voltages on the collectors of the first and second transistors remain substantially constant and equal to one another during input signal transitions.

Means are also provided to regulate the current through the above variable current means so as to compensate for variations in the supply voltage for the pulse receiver.

The invention and other features thereof will be understood more clearly and fully from the following detailed description of an illustrative embodiment of the invention with reference to the accompanying drawings in which:

FIGURE 1 shows a schematic of an illustrative embodiment of this invention; and

FIGURE 2 shows the waveforms associated with the embodiment of this invention depicted in FIGURE 1.

Reference should now be made to FIGURE 1, which shows a preferred embodiment for keeping the impedances presented to the input conductors or lines 16 and 18 of the balanced line substantially equal to one another as transitions occur in the signals occurring on the balanced line. Reference should also be made to the waveforms of FIGURE 2. When the input signals A and B as shown to the left of FIGURE 2*a*, are present on the lines or conductors 16 and 18, respectively, the switching transistor or switching means 20 is cut off and switching transistor or switching means 22 is turned on. A current path is provided through resistor 24 and transistor 22 from the supply 26 to the supply 28, which may be +6 volts and −6 volts, respectively. Note that since collector 38 of transistor 22 is connected directly to supply 28, the voltage at collector 38 will certainly remain constant during signal transitions on line 18.

Since transistor 20 is cut off, current through load resistor or load means 30 is supplied by a transistor or variable current means 32, which provides a current path from source 26 (which may be +6 volts) through resistor 34. The value of resistor 34 is substantially greater than that of load resistor 30 and, therefore, the voltage at the collector 36 of transistor 20 is substantially equal to the voltage at the collector 38 of transistor 22. Since both of these voltages are substantially equal, the impedances presented to the input signals on lines 16 and 18, respectively are substantially equal at the initiation of an input signal transition.

Reference should now be made to waveforms A and B appearing on lines 16 and 18, as shown at S in FIGURE 2*a*. Since the input signals on lines 16 and 18 are undergoing a transition, transistor 22 is being cut off and transistor 20 is being switched on. The collector 38 naturally remains at the constant voltage of −6 volts since it is directly connected to the source 28. Since transistor 20 is being switched on, a current path is now provided through resistor 24, transistor 20 and load resistor 30 from the +6 volt supply 26 to the −6 volt supply 28. The voltage at collector 36 remains substantially equal during the input signal transition to the voltage that was present at collector 36 when transistor 20 was off because transistor 32 conducts less current when transistor 20 is switched on and, therefore, the total current through load resistor 30 remains substantially constant before, during and after the signal transition occurring on line 16. Further, the voltage at collector 36 remains substantially equal to the voltage occurring at collector 38 since most of the voltage drop from the source 26 to the source 28 occurs across resistor 24, its resistance being substantially higher than that of load resistor 30. Since the voltages at collectors 36 and 38 remain substantially equal as transitions occur in the input signals occurring on lines 16 and 18, the impedance presented to each of these lines remains substantially equal, and therefore, no one voltage level is favored over the other. This, of course, decreases the probability of errors in the system as discussed before.

Broadly speaking, transistor 32 may be termed a variable current means since the amount of current it conducts varies in accordance with the input signals applied on lines 16 and 18. Whenever the term "variable current means" is employed in the claims, it will be used in the above sense and applied to transistor 32 or an equivalent thereto.

It will now be shown how the invention causes a transition to occur at the output of the pulse receiver whenever a transition occurs on the balanced line input. As has been noted before, whenever a transition occurs on line 16 (there, of course, being a corresponding transition on line 18), transistor 32 conducts less and, therefore, the voltage at terminal 40 will increase toward the +6 volt supply 26 since the current through resistor 34 will also decrease. It is this change in voltage which is utilized to develop the output or information signal between the desired two logical levels. For instance, as shown in FIGURE 2*b*, the output signal may vary between +.2 volt and +1.2 volts. In order to develop this output signal, an emitter follower circuit comprising transistor 42 and resistor 44 is provided. Thus, the emitter follower drives a low impedance output line whose impedance is symbolized by resistor 46.

Note that the pulse receiver employs a common base amplifier stage 32 anl common collector amplifier stages 20, 22 and 42. It is known that these two types of amplifier stages will pass higher frequencies (or will amplify pulses with faster rise and fall times) than will common emitter stages. This results in the pulse receiver being able to pass frequencies as high as approximately 100 mc. or to amplify pulses with rise and fall times as short as approximately 3.5 nanoseconds. See FIGURE 2*b* for typical rise ($t_r$) and fall ($t_f$) times available with the pulse receiver. To further facilitate high speed operation, high frequency transistors are employed for transistors 20, 22, 32 and 42.

Further, as will be described hereinafter, the use of low voltages in the pulse receiver allows the use of low resistances without excessive power dissipation. Because of the low resistances, the effects of transistor terminal capacitances are reduced and thus this further enhances the high speed capabilities of the pulse receiver.

Transistors 20, 22, 32 and 42 are never saturated, and only transistors 20 and 22 may be turned off. Therefore, these transistors are operated with non-saturating logic; this resulting in decreased storage or delay time of the pulse receiver. For an indication of the undesirable effects of a long delay or storage time means on a pulse receiver, see FIGURE 2*b* ($t_d$). Since the storage or delay time decreases the amount of the to respond of the pulse receiver to the input signal, the undesirability of operating the transistors with saturating logic is evident and, therefore, the transistors of the instant pulse receiver are preferably operated with non-saturating logic thereby decreasing the delay or storage time to about 3 nanoseconds as shown in FIGURE 2*b*.

Further means are provided to compensate for any deleterious effect of voltage variations on the supply voltages provided from supplies 26 and 28 respectively. To understand how the supply variations are compensated for, reference should now be made to FIGURES 1 and 2. Assuming that the waveforms A and B as shown in FIGURE 2*a* are at 0.3 volt and on the base of transistor 20 and −.03 volt on the base of transistor 22, transistor 20 will be off and transistor 22 will be on and conducting. As transistor 20 is off, all of the current flowing through resistor 30 will flow into transistor 32, as described before. If the −6 volt supply 28 happens to decrease to −8 volts, while the voltage on the base of transistor 32 remained constant, the current into transistor 32 would increase. The voltage at the collector of transistor 32 would then drop and accordingly the output signal at the emitter of transistor 42 would also drop. This undesirable variation in the output signal increases the probability of errors occurring in the system; and therefore, means are provided to compensate for fluctuations or variations in the supply voltages, thereby overcoming the above undesirable effect.

The base of transistor 32 is biased from the −6 volt supply 28 through the resistor combination comprising resistors 48 and 50 and limiting resistor 52. Therefore, as the voltage on the emitter of transistor 32 tends to decrease with the decrease of the supply voltage 28 from −6 volts to −8 volts, the voltage on the base of transistor 32 will also decrease thereby maintaining the voltage across the base emitter junction of transistor 32 substantially constant with variations in the supply voltages. Therefore the current remains substantially constant through transistor 32, and the change in the output voltage voltage at the emitter of transistor 42 will be small or negligible. Hence, the pulse receive can properly function without introducing unwanted signal variations into the output signal whenever supply voltage variations occur.

If the input signals on the bases of transistors 20 and 22 are reversed (that is, a +0.3 volt on the base of transistor 22 and a −0.3 volt on the base of transistor 20), transistor 20 will be on and conducting and transistor 22 will be off. Transistor 20 will supply the current for resistor 30 and the current in transistor 32 will drop, as described hereinbefore. This will result in a positive output voltage from the receiver. If the +6 voltage supply 26 is increased to +8 volts, the current through transistor 20 will increase attempting to cause a decrease in the current from the transistor 32. However, the base of transistor 32 is connected to the +6 volt supply 26 once again through the compensating network comprising resistors 48 and 50 and limiting resistor 52. Therefore, with an increase in the +6 volt supply 26, the bias voltage on transistor 32 will also increase, thereby maintaining the current through transistor 32 substantially constant. Hence, there is little change in the output signal appearing at the emitter of transistor 42 when the +6 volt supply varies.

Supply voltage variations are generally introduced because of the temperature or humidity variations or some other fluctuations in the environment surrounding the supply voltage sources. These supply voltage variations introduce undesirable effects as noted above. However, it can be seen from the above discussion that the pulse receiver of the instant invention operates substantially independently of the supply voltages. This allows the use of lower supply voltages with little resulting shift in the level of the output signal. This would not be possible without the combined plus and minus biasing of the base of transistor 32 from the sources 26 and 28 through the compensating network comprsising resistors 48 and 50 and limiting resistor 52. Bypass condenser 56 is provided to substantially cancel out too-rapid variations in the biasing voltage supplied to the base of transistor 32.

The tracking by the compensating network as described above of the supply voltages not only allows reduction of the supply voltages, but actually allows a greater percent of supply voltage variations while the pulse receiver continues to function properly. Thus, voltage margins for the pulse receiver are generally better than ±25% on both supplies 26 and 28 in either parallel or opposing changes.

There has now been described circuitry which provides means (including resistors 24, 34 and 30 and transistor 32 and the +6 volt supply 26 and the −6 volt supply 28) for maintaining the impedances presented by the pulse receiver to lines 16 and 18 substantially constant as input signal transitions occur on the lines 16 and 18. More particularly, there has been described first means (including −6 volt supply 28 and resistor 24 and +6 volt supply 26) for presenting a first impedance to the signal occurring on input line 18 to the pulse receiver; second means (including resistor 34 and load resistor 30 and transistor 32) for presenting a second impedance to a second input signal occurring on line 16 when the transistor 20 is initially being switched on by an input signal transition on line 16, said second impedance being substantially equal to the first impedance provided by the above first means; and third means (including resistor 24 and load resistor 30 and +6 volt supply 26 and — 6 volt supply 28) for maintaining said second impedance substantially equal to said first impedance during said input transition.

In order to illustrate a working embodiment of the invention, a table is given below which gives particular values which may be used for the components within the circuit of FIGURE 1. There is no intent to restrict the invention to the particular values given.

| Component: | | Value |
|---|---|---|
| Resistor— | | |
| 24 | ohms | 1200 |
| 30 | do | 300 |
| 34 | do | 2400 |
| 39 | do | 620 |
| 44 | do | 470 |
| 46 | do | 56 |
| 48 | do | 1500 |
| 50 | do | 390 |
| 52 | do | 100 |
| DC voltage supply— | | |
| 26 | volts | +6 |
| 28 | do | −6 |

Although switching transistors 20 and 22 have been illustrated as PNP type and transistor 32 has been illustrated as a NPN type, and transistor 42 has been shown as a PNP type, it is within the scope of the invention to reverse the particular types illustrated, and, accordingly, the bias voltages therefor, in order to obtain a similar effect to that of the preferred embodiment shown in FIGURE 1.

Although a specific embodiment of the invention has been shown and described, it will be understood that it is but illustrative in that various modifications may be made therein without departing from the scope and spirit of this invention.

What is claimed is:

1. A pulse receiver for receiving information signals from a balanced input line comprising:

first and second switching means;

means for presenting a first impedance to one side of said balanced line including said first switching means; and means for maintaining a second impedance presented to the other side of said balanced line substantially equal to said first impedance during signal transitions, said maintaining means including said second switching means and variable current means for conducting a variable amount of current during said transitions.

2. A pulse receiver as in claim 1 where said second switching means conducts a first current during the initiation or onset of said signal transitions and where said variable current means maintains the current in said second switching means substantially constant during said signal transition, thereby maintaining said first and second impedances equal during said signal transitions.

3. A pulse receiver as in claim 2 including means for maintaining the effect of said variable current means on said impedances constant during variations of the supply voltages for said pulse receiver.

4. A pulse receiver of the class having a pair of input signals differentially connected at its input and a single output signal responsive to the transitions in said input signals, comprising a first means for providing a substantially constant first impedance to said first input signal, a second means for providing a second impedance to said second signal when said second switching means is initially closed, said second impedance being substantially equal to said first impedance, and a third means for maintaining said second impedance at a substantially constant value while said second switching means is being switched closed from its open state by a transition in said second input signal.

5. A pulse receiver as in claim 4 wherein said third means works in conjunction with said second means for maintaining said second impedance substantially constant.

6. A pulse receiver as in claim 4 where said output of said pulse receiver is responsive to said second means, which provides said output signal transitions when said second input signal makes its transition.

7. A pulse receiver as in claim 4 where said first means includes a source of DC voltage and a first resistance, and a first switching means responsive to said first input signal.

8. A pulse receiver as in claim 7 where said second means includes said source of DC voltage, a second switching means, a second resistance having a value of resistance substantially higher than said first resistance, variable current means, and load means for said second switching means, said second resistance, said variable current means and said load means being serially connected to provide said second impedance when said second switching means is initially being switched on.

9. A pulse receiver as in claim 8 where said first switching means and said second switching means are connected as common collector amplifiers and said variable current means is connected as a common base amplifier so that the band width of said pulse receiver extends at least approximately to 100 mc.

10. A pulse receiver as in claim 9 including means for maintaining the voltage on the base of said common base amplifier connection substantially equal in spite of variations in the supply voltages for said pulse receiver, said means including all of the supply voltages.

11. A pulse receiver as in claim 8 where said first and second switching means are operated with nonsaturating logic so that transistor storage times are reduced to at least approximately 3 nanoseconds.

12. A pulse receiver as in claim 8 where said third means includes said first resistance, said load means and said DC voltage source.

13. A pulse receiver comprising:

a first switching means and a second switching means, said switches being connected to each other at a first connection for conducting current toward said first connection, said switches being respectively responsive to a first input signal and a second input signal, said signals being substantially balanced with respect to said first connection;

load means for said second switch;

a first means for providing a substantially constant first impedance to said first input signal during a transition in said input signals;

a second means for providing a first current through said load means thereby providing a second input impedance to said second signal when said second transistor switch is initially switched on, said second input impedance being substantially equal to said first input impedance;

a third means for providing a second current through said load means while said second transistor switching means is being switched on from its off state, thereby maintaining said second impedance substantially equal to said first impedance during said switching; and output means responsive to said second means for providing an output signal when said switching occurs.

References Cited

UNITED STATES PATENTS 3,173,023 3/1965 Talsoe.

ARTHUR GAUSS, *Primary Examiner.*

R. H. PLOTKIN, *Assistant Examiner.*

U.S. Cl. X.R.

307—293; 330—14, 20